United States Patent

Brockman et al.

[19]

[11] Patent Number: 5,826,240
[45] Date of Patent: Oct. 20, 1998

[54] SALES PRESENTATION SYSTEM FOR COACHING SELLERS TO DESCRIBE SPECIFIC FEATURES AND BENEFITS OF A PRODUCT OR SERVICE BASED ON INPUT FROM A PROSPECT

[75] Inventors: Robert T. Brockman, Houston, Tex.; Donald D. Jones, Smiths, Bermuda

[73] Assignee: Rosefaire Development, Ltd., Hamilton, Bermuda

[21] Appl. No.: 587,276

[22] Filed: Jan. 18, 1996

[51] Int. Cl.⁶ ..................................................... G06F 19/00
[52] U.S. Cl. ................................................................... 705/11
[58] Field of Search ........................... 395/226, 227, 395/215, 237, 238, 229, 228, 208, 207, 209, 201, 925; 705/11, 26, 27

[56] References Cited

U.S. PATENT DOCUMENTS

| | | | |
|---|---|---|---|
| 4,415,065 | 11/1983 | Sandstedt | 395/234 |
| 4,530,067 | 7/1985 | Dorr | 395/215 |
| 4,569,421 | 2/1986 | Sandstedt | 395/215 |
| 5,038,284 | 8/1991 | Kramer | 395/237 |
| 5,053,956 | 10/1991 | Donald et al. | 395/227 |
| 5,239,462 | 8/1993 | Jones et al. | 64/408 |
| 5,309,355 | 5/1994 | Lockwood | 364/401 |
| 5,317,503 | 5/1994 | Inoue | 395/229 |
| 5,349,678 | 9/1994 | Morris et al. | 395/200.49 |
| 5,351,186 | 9/1994 | Bullock et al. | 395/226 |
| 5,367,627 | 11/1994 | Johnson | 395/161 |
| 5,386,555 | 1/1995 | Kuroda et al. | 395/600 |
| 5,434,394 | 7/1995 | Roach et al. | 235/375 |
| 5,481,647 | 1/1996 | Brody et al. | 395/925 |
| 5,493,490 | 2/1996 | Johnson | 395/226 |
| 5,584,025 | 12/1996 | Keithley et al. | 395/615 |
| 5,598,487 | 1/1997 | Hacker et al. | 364/709.11 |

FOREIGN PATENT DOCUMENTS

0 514 231 A2  11/1992  European Pat. Off. ........ G06F 15/21

OTHER PUBLICATIONS

Lindsay Chappell, "Carmakers try to make buying simple", Automotive News, vol. 67, Iss. 5483, pp. 3, 42, Dialog File copy 3 pages, Jan. 1993.

Anonymous, "Controlling the Showroom", Automotive News, iss. 5312, p. E20, ProQuest Periodical Anbstracts 2 pages copy, Nov. 1989.

(List continued on next page.)

*Primary Examiner*—Donad E. McElheny, Jr.
*Attorney, Agent, or Firm*—Arnold White & Durkee; Jeffrey A. Pyle

[57] ABSTRACT

A handheld computer unit for use by, e.g., a car sales person (seller) prompts the seller with a standard script to be followed at each step in the process after a prospect enters a dealership. The seller is also prompted to record data about the prospect and the prospect's needs as well as potential trade-in vehicles. In the event that the prospect does not purchase on the initial visit, this information may be transferred to a conventional sales prospect control system to manage the process of later follow-up contacts with the prospect. The handheld unit permits the seller to retrieve useful information such as inventory availability from a sales information data store. The handheld unit also is able to access remote communications links to external data sources to obtain information on credit-worthiness of the prospect, financing terms, and availability. The handheld unit also displays motivational information such as the percentage likelihood of consummating the sale successfully.

31 Claims, 1 Drawing Sheet

OTHER PUBLICATIONS

Campanelli, "Sound the Alarm!," *Sales & Marketing Management*, vol. suppl. issue, pt. 2, pp. 20–22 and 24–25, Dec. 1994.

International Search Report dated Jul. 28, 1997 for International Application No. PCT/IB97/00267.

Chappell, "Small Computers Help Sellers Close Deals, Gather Vital Data," Automotive News, Crain Communications Inc., May 27, 1996, News section, p. 16 (1996).

Christeson, "The trainer's role in sales automation," training and Development, Information Access Co., a division of Ziff Communiations Co.; American Society for Training and Development Inc., vol. 46, No. 12, p. 67 (1992).

Dryden, "Mobile LAN Streamlines Service,", CommunicationsWeek, CMP Publications, Inc., Aug. 29, 1994, Local Area Networks section, p. 19 (1994).

Fillon, "Keep on trucking Yellow Freight trucking; Road Warrior: A Sales Automation Supplement," (company profile), ASAP, Sales & Marketing Management, Information Access Company, a thomson Corporation Company; Bill Communications Inc., vol. 147, No. 6, p. S17 (1995).

McKee, "How 'the good old days' relate to business-to--consumer telemarketing scripts," telemarketing, Information Access Co., a division of Ziff Communications Co.; Technology Marketing Corporation, vol. 11, No. 11, p. 27 (1993).

Orlin, "Selling in teams," (cover story), training and Development, Information Access Co., a division of Ziff Communications Co.; American Society for Training and Development Inc., vol. 47, No. 12, p. 26 (1993).

Radding, "Software Helps Sales Representative, Managers Make Cross–Sellling a Reality; Automation for Relationship Banking," The Magazine of Bank Management (formerly Bank Administration Magazine), Bank Administration Institute, Oct., 1990, Management Software section, p. 78 (1990).

Schroeder et al., "Training salespeople on high–tech notebook computers," Training and Development, Information Access co., a division of Ziff Communications Co.; American Society for Training and Development Inc., vol. 46, No. 12, p. 60 (1992).

Tucker, "Portable Computers 3; Higher–value sales," The Financial Times Limited, Financial Times, Feb. 8, 1991, Survey section, p. III (1991).

Younger, "Sales savvy for the nineties; Four by Four," Training & Development, Information Access Co., a division of Ziff Communications Co.; American Society for Training and Development Inc., vol. 46, No. 12, p. 13 (1992).

[No author listed], "Twelve years of innovation; Foodservice Distribution: The Evolution of an Industry," ASAP, Information Access Company, a Thomson Corporation Company; Bill Communiations Inc. (Institutional Distribution), vol. 21, p. 279 (1985).

[No author listed], "Solectek AIRLAN wireless products selected for use in automated auto service system," Business Wire, Business Wire, Inc., Aug. 1, 1994.

SALES PRESENTATION SYSTEM FOR COACHING SELLERS TO DESCRIBE SPECIFIC FEATURES AND BENEFITS OF A PRODUCT OR SERVICE BASED ON INPUT FROM A PROSPECT

BACKGROUND OF THE INVENTION

The cost of any goods or services that are sold include costs of marketing. Every item (tangible or intangible) that is sold has included in its costs, the costs of "selling" it. Millions of people are employed in "selling" and hundreds of millions of man-hours are expended in direct face-to-face "selling" every year in the United States. The cost of "selling" is every bit as real a part of the cost of an item or service as is the direct labor cost involved in manufacturing the item or providing the service.

It is generally estimated that less than 10 percent of a salesperson's total time is spent actually "selling"—i.e. the direct face-to-face contact with a prospective buyer. Therefore the efficiency of the face-to-face sales process is directly related to the quality with which the face-to-face contact is carried out.

The present invention relates to a computer system that addresses some common information-flow problems in a large "industry," namely the sales process. The computer system organizes specific information to assist salesmen or saleswomen (referred to generically as "sellers") and management in making a presentation to a potential purchaser ("prospect"), in a methodical and consistent manner. Use of the system by a seller produces a number of practical benefits, including a more effective matching of the prospect's needs to one or more specific products or services to the needs of the prospect, as well as faster determination of appropriate financing arrangements. This in turn results in a more satisfactory experience for the prospect and better on-the-job training for an inexperienced seller, both of which lead to more effective utilization of capital by the seller or his or her employer.

In a nutshell, the computer system reduces costs associated with selling, resulting in exactly the same benefits —lower cost and more effective utilization of capital —as systems which reduce costs associated with research, development, design, manufacturing, maintenance, etc.

Human-Factors Problems in Large—Volume Sales Organizations

The sales process can be usefully thought of as an interaction between a prospect and a seller. When performed correctly, the process comprises a logical series of exchanges of information between the seller and the prospect, between the seller and management, between management and a credit bureau, etc. The actual steps will vary depending upon the type of product and the industry, but the concept of the sales process being a sequence of definable information exchanges remains the same.

Historically, however, the actual process of selling, when done on a large scale, has been a disorganized one. Some people are thought of as "born sellers" and need little training to be effective. With suitable training, many other individuals can learn the sales process and achieve good results. In large sales organizations such as car dealer-ships, however, turnover is frequently high. As a result, it is often not possible to count on having a population of sellers who all either are born sellers or have had suitable training. That means that variations in natural ability and training lead to what amount to inefficiencies of scale, with a concomitant reduction in productivity.

Such inefficiencies are not inherent to large-scale sales. A significant weakness of selling on a large scale is the inability to enforce a certain measure of standardization of the sales process on large numbers of sellers so that they consistently utilize proven sales techniques.

Sales efficiency (defined here as the ratio between sales consummated to prospective buyers dealt with) improves dramatically when sellers record sufficiently complete data on sales prospects to achieve other goals, such as follow-up communication by phone or mail with those prospects that did not make a purchase, correct determination of closing ratios for each individual seller, or analysis of the advertising source that initially captured the prospect's attention. Inefficient sellers can be given additional training or, if necessary, weeded out when correct determination of sales efficiency ratios for individual sellers can be made accurately, quickly, and with reduced overhead. Advertising efficiency (defined here as the ratio of advertising dollars spent to the gross sales volume produced) is enhanced by analyzing the advertising sources that initially capture prospect attention.

An illustration of the need for such a system can be seen in a car dealership, an area in which very large dollar volume sales occur and the sales process is sometimes poorly administered. In general, dealerships have several characteristics in common:

1. Due to less-than-perfect (or even virtually non-existent) pre-employment screening, dealerships may hire sellers that lack true sales proficiency, a problem in most types of retail sales operations.

2. Due to long hours, Saturday work days, and a poor industry image, car dealerships may suffer from high levels of personnel turnover, particularly in the sales departments (in which 100%+turnover per year is not uncommon).

3. Due to turnover, dealerships are faced with a constant re-training need, which in some cases is poorly accomplished.

4. Many dealerships hire experienced sellers from other dealerships on the assumption that they are good at what they do and do not require training, when in fact these experienced sellers may use very poor sales techniques.

5. Many dealerships refrain from hiring new, inexperienced sellers because they do not want to make an investment in training or suffer loss of productivity as a new seller comes up to speed.

7. Ironically, dealerships do not want to invest in sales training precisely because cause turnover is high and the investment would be "wasted" in their view. This tends to produce high failure rates among new sellers.

Prior Attempts at Standardizing the Sales Process

A scattered few vehicle manufacturers (e.g., Lexus, Infiniti, and Saturn) have spent large amounts of time and money attempting to improve the quality and consistency of procedures to control the sales process. Dealerships that exert control over the vehicle sales process have in general been far more successful than those that have not. Many of these dealerships have elaborate pencil and paper control procedures. Some employ computerized systems, but as far as is known they record data only after the fact.

Long-Felt Need

Despite the modest success of these procedures, direct real-time supervision of the sales process has long been recognized as difficult. To be effective, such supervision must take place where the sales presentations are made, i.e., in changing physical locations throughout the dealership, not at a desk or counter where a supervisor can observe. A sales manager's presence during the conversations between the seller and the prospect, however, is likely to undermine the rapport-building that can be critical to the success of the sales process.

The problem is exacerbated by the need for ready communication between the seller and his or her manager, or "control desk." Thus, the need for direct managerial supervision is simultaneously created and made more difficult by the nature of the business. The need is highlighted by the fact that, because considerable advertising dollars are invested in attracting new business to the dealership, each prospect that is handled less than optimally may represent a substantial lost profit opportunity.

SUMMARY OF THE INVENTION

A computer system in accordance with the present invention addresses many of these problems, including improvement, standardization, and enforcement of the sales process; efficient training of new sellers; and real-time control of the process by management. The system comprises one or more handheld computer units used by sellers that may be linked with a central computer unit. Each dealership decides the exact sequence that it would like its sellers to follow. The handheld unit coaches the seller by prompting him or her with a standard script to be followed at each step in the process after a prospect enters the dealership. The seller is prompted to record data about the prospect and the prospect's needs as well as potential trade-in vehicles; this data is used by the handheld unit in determining the precise sequence of steps that should by the seller in meeting with the prospect. Those steps include the presentation of specific features and benefits of one or more products and services that might suit the prospect's needs or desires In the event that the prospect does not purchase on the initial visit, this information may be transferred to a conventional sales prospect control system to manage the process of later follow-up contacts with the prospect. The handheld unit permits the seller to retrieve usefull information such as inventory availability from a sales information data store to further the steps in the sales process. The handheld unit also is able to access remote communications links to external data sources to obtain information on credit-worthiness of the prospect, financing terms, and availability. The handheld unit also displays motivational information such as the percentage likelihood of consummating the sale successfully.

DETAILED DESCRIPTION OF SPECIFIC EMBODIMENTS

Figure 1:
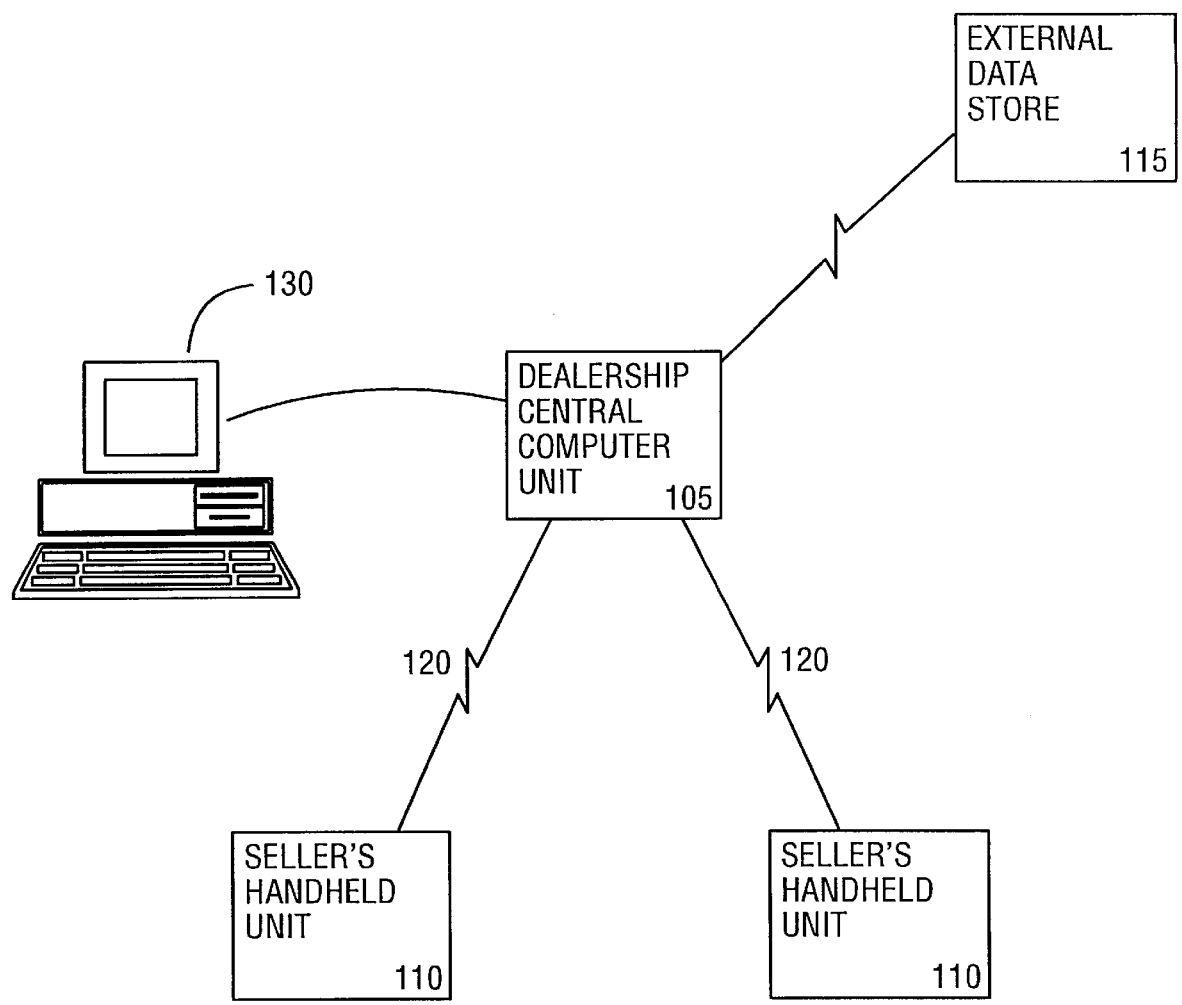
FIG. 1 is a block diagram of a system in accordance with the invention.

One illustrative embodiment of the invention takes the form of a system for enforcing recording, by a seller, of information about a vehicle-purchase prospect at an automobile dealership. In the interest of clarity, not all features of an actual implementation are described in this specification. It will of course be appreciated that in the development of any such actual implementation (as in any computer-system development project), numerous engineering and programming decisions must be made to achieve the developers' specific goals and subgoals (e.g., compliance with system- and business-related constraints), which will vary from one implementation to another. Moreover, attention will necessarily be paid to proper programming practices for the environment in question. It will be appreciated that such a development effort might be complex and time-consuming, but would nevertheless be a routine undertaking of system development for those of ordinary skill having the benefit of this disclosure.

As shown in FIG. 1, at its most basic, the illustrative system comprises one or more seller computer units 110 operated by sellers and may also include a central computer 105. The seller computer unit 110 may be of a size suitable to held in a seller's hand, referred to simply as a "handheld" unit, and the illustrative examples discussed below all involve such handheld units. Alternatively, the seller computer unit 110 may comprise a fixed unit, e.g., a desktop computer with suitable programming.

The handheld computer unit 110 manages a sales-information data store, utilizing any convenient database management system (DBMS) software. This sales—information data store may also be located on the central computer. The external data store(s) are remotely located at places such as vehicle manufacturers, credit bureaus, and credit granting institutions on their computer systems 115.

The Sales—Information Data Store

The sales—information data store, which may be maintained at or by the hand held computer unit 110, or at the central computer 105, or both, includes a number of specific databases. Virtually any of the databases referred to here in can be either local databases on the handheld unit (updated periodically from a central computer or other data store, e.g., via a serial or parallel cable, a network connection, a radio link, or an infrared link) or remote databases located on the central computer, accessed through a conventional disk search or through an on-line query. Some or all of the databases may be combined if desired into a single complex database, as will be recognized by those of ordinary skill having the benefit of this disclosure. The databases include:

(1) a vehicle-inventory information database, which can include both a dealer's database as well as those vehicles in the inventory of other dealerships in a commonly owned group of dealerships. Inventory information is valuable when the seller cannot locate the particular item sought by the prospect;

(2) a customer database, containing conventional information about customers who have made purchases, enabling the seller to identify a prospect as a valuable repeat customer if one should return to the dealership;

(3) a prospect database, likewise containing similar information about prospects who have visited the dealership. With this information, management can determine if there is a pattern in the point at which sales processes are breaking down, or whether a certain seller suffers from very poor sales efficiency. Very importantly by interrogating this database a prospect can be identified as a returning prospect. A returning prospect, known in the auto industry as a "be-back" prospect, has a percentage likelihood of successful consummation of sale that is easily triple that of a prospect on a first time visit. The reason for this is that a "be-back" prospect has completed his or her shopping process and is now ready to make a purchase. For this reason a "be-back" prospect is especially valuable and deserves special attention. Further, the availability of such information saves the time involved in re-entry of data if the prospect returns to the dealership at a later date;

(4) a pending-transaction database, referred to colloquially herein as a "deal" database. Typically a record is started in the pending-transaction database when the first actual offer is made to or by the prospect. Stored information on pending transactions allows managers to monitor sales transactions as they are taking place, enabling them to insert themselves into the sales process if a deal begins to turn sour; and (5) control-record information, which can provide, for example: data on financing and leasing plans; data on taxes and fees that would apply to the particular sale; information on other products or services frequently sold in conjunction with the desired purchase item, information on commission rates that apply to various components of the sale, or the sequence and content of each step in the sales process.

External Data Stores

Useful information may be contained within databases at one or more external data stores 115 such as manufacturers, credit bureaus, and credit-granting institutions. For example, vehicle manufacturers commonly maintain real-time updated databases of vehicles on order, in production, in transit, and in the inventories of all dealerships nationwide. When a situation is encountered where the dealership does not have on hand the vehicle that the prospect desires, the seller can access this external data store from a handheld computer to see if a suitable unit exists somewhere in the distribution system.

These external data stores may be accessed directly from the handheld unit or thru the communications network to the central computer that has a conventional modem attachment to the telephone network to the vehicle manufacturer.

The Hand-Held Computer Unit

The handheld computer unit 110, referred to as a handheld unit, may be a custom-designed unit or a suitably programmed subnotebook computer or personal digital assistant (PDA). It may be a stand-alone unit; or it may be designed for use as a smart wireless terminal in a larger system including a central computer unit 105; or it may be designed to operate in either stand-alone or smart-terminal mode at the user's option.

Wireless link 120

The handheld unit 110 may have a conventional communications interface or link 120 to the central computer unit 105 or to other handheld unit(s) 110, preferably a wireless link 120 to enable user mobility. The wireless link 120 may take the form of, e.g., a radio modem, an infrared beam, or similar devices.

Input device

The handheld unit 110 has a conventional input device operable by the seller for recording data about the prospect, along with suitable conventional programming for managing the input process. The input device may take the form of, e.g., a keyboard; a touchscreen such as those found on many PDAs; a pointing device such as a mouse, trackball, or J-stick; or a voice-recognition unit. The input device may also have a audio recording input capability.

Transmission of prospect data

The handheld unit 110 may include programming for transmitting prospect data to the central computer unit 105 or to other handheld units 110 via the communications link. The prospect data may be transmitted to the central computer unit 105, but may also be retained locally at the handheld unit 110.

Sales information requests

The handheld unit 110 includes programming for interrogating the sales-information data store to obtain information requested by the seller. This may include, e.g., inventory information to determine which cars are in stock or can be obtained quickly.

Display

The handheld unit 110 includes a conventional display (e.g., an LCD display) and suitable programming for displaying requested sales information to the seller. As noted above, display of the requested information may be contingent on the seller having entered all required prospect data and complying with steps in the sales communications process that is required by sales management.

Local data store

The handheld unit 110 may include a local data store (e.g., read-write memory or "RAM," flash memory, or a hard disk drive) for locally storing some or all of the sales information data store. This permits the handheld unit 110 to operate independently of the central computer unit 105 if desired, advantageously reducing wireless communications traffic and permitting use of the handheld unit 110 if the central computer or wireless communications link are inoperable.

External data store

The handheld unit 110 may access databases at external locations such as the external data store 115 via direct communications or by communications over the wireless link 120 to a central computer 105 which has a conventional modem-type communications link over telephone lines to the external data store.

Sales Communication Process

Specified Sequence

The handheld unit 110 includes programming to prompt the seller to perform a specified sequence of steps in a desired sales communication process. The programming may take the form of pre-stored scripts, in a suitable macro-like script language, that are conventionally interpreted by an interpreter (or alternatively are conventionally compiled into executable form) and which, when executed by the handheld unit 110, cause the handheld unit 110 to display appropriate messages on a display.

Different scripts may be used for different sales contexts. For example, a script for an in-person visit by a prospect may prompt the seller to handle the encounter differently than for a telephone inquiry.

The sales communications process(es), and thus the script (s), will normally include obtaining prospect data and recording it in a data store in the handheld unit 110; the scripts preferably take into account the prospect data as it is entered by the seller. For example, if the initial prospect data entered by the seller indicates that the prospect is young, then the programming script may prompt the seller to ask whether the prospect would be interested in a first-time-buyer financing package and to record that prospect data.

Product Presentations

The handheld unit 110 may include programming to display a series of scripted product features and benefits. These scripts may vary based upon the particular product that the prospect is interested in. A comprehensive product presentation is key element of a successful sales process.

Recording of Data

For greater usefulness of the system, the seller is asked to record the prospect's personal information such as name, address, etc., early in their meeting. As the seller records the information into the handheld unit 110, the information may be conventionally transmitted (on a real-time basis or periodically in a batch) to other handheld units 110 or to the central computer unit 105 for storage in the appropriate database for use in a conventional sales prospect follow-up system. Thus, no matter how the sales transaction ends, the dealership will always have a record of the prospect's visit and can follow-up the visit with a letter or phone call.

Human factors are a disincentive to comply with recording of prospect data: Since sellers are evaluated on their sales efficiency, they have a disincentive to record data on prospects that do not purchase since this would reflect negatively on their sales efficiency ratios. Historically for this reason sellers in this situation have done a very poor job of collecting prospect data in spite of its obvious usefulness to the dealership.

Incentives to Comply with Sales Process

Notably, the sales-information- request programming of the handheld unit 110 includes one or more program routines to deny access by the seller to the sales-information data store and to the remote communications links to the external data sources, and to display an appropriate reminder message, if the seller has not complied with the specified steps in the sales process. This gives the seller an large incentive both to comply with the process and to record data as required by the process. For example, the program routines may prevent the handheld unit 110 from accessing the vehicle-inventory information database if all required prospect data has not been entered. Alternatively, the routines may permit the handheld unit 110 to obtain the requested data from the sales information data store, but then not permit the data to be displayed until all required prospect data has been entered. As with many of the program routines described for the handheld unit 110, these program routines may equivalently be located in and control the central computer unit 105 to prevent that unit from transmitting requested data to the handheld unit 110.

Time stamps

The illustrative handheld unit 110 includes suitable conventional programming for recording time stamps to identify the time and or duration of performance of respective steps in the desired sale communication process. The time stamp records are used to record the actual time (either clock time or elapsed time during the sales encounter) at which the seller records specified information. This permits sales management to confirm with reasonable confidence that the seller is in fact performing the appropriate steps in the sales communication process instead of, e.g., recording fabricated or "bogus" data all at once. For example, if the manager sees that a certain seller's tour of the dealership facilities with a prospect lasted only 15 seconds, the manager knows the seller has circumvented that step in the process and can counsel him or her. The time stamps can both be recorded locally at the handheld unit 110 or uploaded to the central computer unit 105 via the communications link for statistical analysis of seller performance. Alternatively, the time stamp records can be created at the central computer unit 105 as prospect data and other data are transmitted by the handheld unit 110.

External Checks on Process Completion

Suitable programming can be included in the handheld unit 110, the central computer unit 105, or both, for receiving and processing a signal from an external device indicating that a specified step in the sales communication process has been completed. The external device may be, e.g., a sensor in an vehicle key storage machine that signals when a particular seller, identified by a password or an electronic keycard (similar to a bank automated teller machine card), checks out the keys to a car for a test drive. Other external devices may be advantageously utilized to verify the physical location of the seller at a particular time, thus serving as an additional check on the seller's compliance with the specified sales communication process.

Similarly, programming can be included for sending a signal to a gate controller to open a vehicle access gate. The seller, when driving out of the dealership parking lot for a test drive, thus can use the handheld unit 110 to send a signal to the gate controller, either directly or via the central computer unit 105. The handheld computer 110 logs the fact that the seller is leaving the premises on a test drive with the prospect in question. Again, this verification of the seller's physical location at a particular time serves as a check on the seller's compliance with the sales process.

Selective Audio Recording

Conventional hardware and suitable programming may be included in the handheld unit 110 for selective audio recording of a conversation between the seller and the prospect. Selective audio recording of the actual conversation between the seller and the prospect can be useful. For example, Saleswoman A may be known to perform well in obtaining initial prospect wants and needs. Audio recording of this portion of her conversation with the prospect may be deemed unnecessary and thus can be skipped. On the other hand, Salesman B may be weak in this area; when he indicates on the handheld unit 110 that he is in this phase of the desired sales communication process, the handheld unit 110 may automatically commence audio recording until the next phase of the conversation. Sales management is then able to selectively listen to the actual sales process as it progressed and counsel the seller on sales techniques. If required by privacy laws, the handheld unit 110 may be programmed to play an audible message on commencement of recording, such as "to help ensure quality service, this conversation may be monitored or recorded."

Financing Aspects

The handheld unit 110 may include programming for transmitting identifying information about the prospect and a creditworthiness inquiry to a financial institution computer 125, and for receiving and processing a creditworthiness report from that computer. If the handheld unit 110 includes an input device that can store a signature digitally, then the prospect can be asked to "sign" an authorization granting the dealership permission to access the user's credit history. The input device may be a conventional pen- and touch-screen interface of the kind found in some PDAs; a similar device of the kind found at some cash registers for credit card authorizations; or the like. Access to the financial institution computer 125 may be via direct link or may be through a conventional data link such as a modem controlled by the central computer unit 105. The financial institution may be a credit bureau or an actual financing source. In the latter case, the financing source may perform its own credit check and make a preliminary creditworthiness determination to be transmitted back to the seller. This in turn helps the seller qualify the prospect, i.e., to determine the price range of the vehicle for which the prospect is likely to be able to obtain financing.

Computation of Finance Terms

The handheld unit 110 may include conventional programming enabling the seller to use it as a financial calculator for calculating, e.g., lease payments, loan payments, and the like. As the sales process progresses, the prospect data, creditworthiness report, and finance terms may be transferred to another handheld unit 110 or a central computer system 105 for finalization of paperwork or for negotiation purposes as described below.

Real-Time Negotiation

The handheld unit 110 programming may include routines to permit the seller to send offers to and counteroffers to other handheld computers 110 or the central computer unit 105. A sales manager or similar person may read and respond to these exchanges, e.g., using another handheld unit 110 or a terminal 130 attached to the central computer 105. By eliminating most of the seller's trips back and forth from the prospect to the sales manager's desk, much of the time needed to consummate a sale is reduced. This reduction of time spent in the negotiating process is a vital element in improving sales efficiency since if this process becomes extended, the prospect is increasingly likely to have misgivings and decline to consummate the sale. The capacity for real-time negotiation becomes increasingly valuable in situations of high activity (like a Saturday), when there are a large number of sellers per sales manager, when the average experience level of sellers is low, when there is a large number of sellers working at a single location, or when the physical distances at a given location between sellers and sales management are large.

Real-Time Sales Progress Display

The programming of the handheld unit 110 may include routines for real-time computation and display of sales progress information applicable to the transaction. For example, the likelihood of closing the sale may be estimated and displayed on the handheld unit 110 by comparing factors such as (a) the length of time that the prospect has consented to spend with the seller during each step of the sales process, and/or (b) the number of steps in the process that have been completed, with historical data on previous sales process outcomes (e.g., stored in the sales information data store) for that dealership, that city, etc. This likelihood may be displayed in a variety of ways (e.g., a percentage number, a gas-gauge indicator, etc.) to show the likelihood of closing the sale going up as each step is completed. This encourages the seller to perform each step thoroughly, taking sufficient time to communicate the desired information to the prospect.

Real-Time Sales Commission Display

The programming of the handheld unit 110 may include routines for real-time computation and display of the commission that would be paid to the seller if the sale were to be consummated on the specified terms. This can serve as a powerful sales motivator for the seller.

Comparative Ranking Among Sellers

The handheld unit 110 may also be programmed to display a list of sellers at the dealership, ranked by performance for a given period, e.g., by sales achieved in a given month. This constantly updated real-time display of sales rankings also can serve as a sales motivator for sellers.

OTHER REMARKS

Use of the system described above helps management enforce the desired standardization of the sales process. The seller cannot advance through the prescribed sales process until he or she has completed all prior steps. In this way, management is assured that each prospect receives the treatment that has been deemed most effective in making a sale.

For example, the handheld unit 110 ordinarily allows the seller to retrieve and view sales information from the sales information data store for the benefit of the prospect (e.g., to determine whether a particular model in stock). However, if the seller has not recorded the prospect's personal information such as name, address, and telephone phone number, the system will not allow the seller to retrieve that information. Thus, unless the seller follows the prescribed program, he or she is effectively prevented from proceeding. However, if the seller progresses through the prescribed steps, the handheld unit 110 may inform the sales management of each step completed successfully. In this way, management keeps abreast of which transactions have been dragging in critical stages, when management assistance might be useful.

The system provides other benefits besides adherence to the sales process. New sellers are easily trained on the job: once they learn to use the sales machine, it gives them a step-by-step script to follow, taking the guesswork out of the learning process.

Sellers are prompted through a thorough product presentation of features and benefits. These product presentations are specific to the product that the prospect desired to purchase.

Also, management now has an accurate picture of each seller's sales efficiency (ratio between number of sales completed per number of prospects seen). In a paper based system, sellers had a disincentive incentive to record the visits of prospects who made no purchase, so management did not get any real idea of how well each seller was performing.

PROGRAM STORAGE DEVICE

As noted above, any of the foregoing variations may be implemented by programming a suitable general-purpose computer having appropriate hardware. The programming may be accomplished through the use of a program storage device readable by the computer and encoding a program of instructions executable by the computer for performing the operations described above. The program storage device may take the form of, e.g., one or more floppy disks; a CD ROM or other optical disk; a magnetic tape; a read-only memory chip (ROM); and other forms of the kind well-known in the art or subsequently developed. The program of instructions may be "object code," i.e., in binary form that is executable more-or-less directly by the computer; in "source code" that requires compilation or interpretation before execution; or in some intermediate form such as partially compiled code. The precise forms of the program storage device and of the encoding of instructions is immaterial here.

It will be apparent to those of ordinary skill having the benefit of this disclosure sure that numerous variations are possible from the illustrative embodiments described above. Accordingly, it is the claims below and not the illustrative embodiments that measure the exclusive rights claimed in the invention.

What is claimed is:

1. A sales support computer comprising:
   (a) means, operable by a sales person, referred to as a seller, for recording data, referred to as prospect data, about a prospective purchaser, referred to as a prospect;
   (b) means for interrogating a sales information data store to obtain information requested by the seller, referred to as requested sales information;
   (c) means for displaying the requested sales information to the seller; and
   (d) means for displaying a series of prompts to the seller, as a function of the prospect data, to prompt the seller to perform steps in a desired sales communication process during an encounter with the prospect, including one or more prompts to the seller to describe orally to the prospect one or more specific features and benefits of a product or service.

2. The sales support computer of claim 1, wherein at least a part of said sales information data store resides within the sales support computer.

3. The sales support computer of claim 1, wherein at least a part of said sales information data store resides within a central computer unit.

4. The sales support computer of claim 1, further comprising means for accessing an external data store.

5. The sales support computer of claim 4, wherein said external data store contains consumer credit information.

6. The sales support computer of claim 1, further comprising means for preventing the seller from perceiving sales information from the sales information data store if the seller does not record the prospect data.

7. The sales support computer of claim 1, further comprising means for preventing the seller from retrieving sales information from the sales information data store if the seller does not comply with the desired sales communication process.

8. The sales support computer of claim 1, further comprising (1) means for accessing an external data store, and (2) means for preventing the seller from retrieving information from the external data store if the seller does not comply with the desired sales communication process.

9. The sales support computer of claim 1, further comprising means for recording the duration of performance of respective steps in the desired sale communication process.

10. The sales support computer of claim 9, wherein the means for recording the duration of performance of respective steps in the desired sales communication process comprises means for recording time stamps identifying the respective times of performance of the steps.

11. The sales support computer of claim 1, further comprising means for receiving a signal from an external device indicating that a specified step in the sales communication process has been completed.

12. The sales support computer of claim 1, further comprising means for selective audio recording of a conversation between the seller and the prospect.

13. The sales support computer of claim 1, further comprising (1) means for transmitting identifying information about the prospect and a creditworthiness inquiry to a financial institution, and (2) means for receiving a creditworthiness report on the prospect.

14. The sales support computer of claim 13, further comprising means for recording a representation of the prospect's signature.

15. The sales support computer of claim 13, further comprising means for transmitting a representation of the prospect's signature to a credit bureau.

16. The sales support computer of claim 1, further comprising means for displaying an estimate of likelihood of closing the sale with the prospect.

17. The sales support computer of claim 1, further comprising means for displaying an estimate of a commission payable to the seller if the sale closes.

18. The sales support computer of claim 1, further comprising means for displaying a ranking of the seller's sales performance in comparison with respective rankings of other sellers' sales performances.

19. The sales support computer of claim 1, further comprising means for transmitting a sales offer and means for receiving a response to the offer.

20. The sales support computer of claim 1, further comprising means for selective audio recording of a conversation between the seller and the prospect.

21. The sales support computer of claim 1, further comprising means for computing financing options for the prospect.

22. The sales support computer of claim 1, further comprising means for accessing a data store of financing option information.

23. The sales support computer of claim 1, wherein said sales support computer is of a size suitable to be held in a seller's hand.

24. A sales support computer, comprising:
(a) means, operable by a seller, for recording data about a prospect, referred to as prospect data; (b) means for displaying a series of prompts to the seller, as a function of the prospect data, to prompt the seller to perform steps in a desired sales communication process during an encounter with the prospect, including one or more prompts to the seller to describe orally to the prospect one or more specific features and benefits of a product or service; and
(c) means for accessing an external data store, including means for preventing the seller from retrieving information from the external data store if the seller does not comply with the desired sales communication process during the encounter.

25. The sales support computer of claim 24, wherein said desired sales communication process includes recording prospect data in a data store in said sales support computer.

26. A sales support computer, comprising:
(a) means, operable by a seller, for recording data about a prospect, referred to as prospect data; and
(b) means for accessing a credit bureau data store, including means for preventing the seller from retrieving information from the credit bureau data store if the seller does not comply with a desired sales communication process during an encounter with the prospect.
(c) said sales communication process including the seller orally describing one or more specific features and benefits of a product or service to the prospect.

27. A sales support computer, comprising:
(a) means, operable by a seller, for recording data about a prospect, referred to as prospect data;
(b) means for transmitting a representation of the prospect's signature to a credit bureau; and
(c) means for accessing a credit bureau data store, including means for preventing the seller from retrieving information from the credit bureau data store if the seller does not comply with a desired sales communication process during an encounter with the prospect;
(c) said sales communication process including the seller orally describing one or more specific features and benefits of a product or service to the prospect.

28. A sales support computer, comprising:
(a) means, operable by a seller, for recording data about a prospect, referred to as prospect data; and
(b) means for accessing a data store of financing option information, including means for preventing the seller from retrieving information from the data store of financing option information if the seller does not comply with a desired sales communication process during an encounter with the prospect;
(c) said sales communication process including the seller orally describing one or more specific features and benefits of a product or service to the prospect.

29. A sales support computer, comprising:
(a) means, operable by a seller, for recording data about a prospect, referred to as prospect data;
(b) means for displaying a ranking of the seller's sales performance in comparison with respective rankings of other sellers' sales performances; and
(c) means for displaying an estimate of a commission payable to the seller if the sale closes.

30. A handheld sales support computer comprising:
(a) means, operable by the seller, for recording data about a prospect, referred to as prospect data;
(b) means for interrogating a sales information data store, at least a part of which resides within a central computer unit, to obtain information requested by the seller, referred to as requested sales information;

(c) means for displaying the requested sales information to the seller, including means for preventing the seller from perceiving sales information from the sales information data store if the seller does not record the prospect data;

(d) means for accessing an external data store;

(e) means for preventing the seller from retrieving information from the external data store if the seller does not comply with a desired sales communication process;

(f) means for recording time stamps identifying the time of performance of respective steps in the desired sale communication process;

(g) means for selective audio recording of a conversation between the seller and the prospect;

(h) means for transmitting identifying information about the prospect, including a representation of the prospect's signature, to a financial institution;

(i) means for accessing a creditworthiness report on the prospect;

(j) means for accessing a data store of financing option information;

(k) means for transmitting a sales offer;

(l) means for receiving a response to the offer (m) means for displaying an estimate of likelihood of closing the sale with the prospect;

(n) means for displaying an estimate of a commission payable to the seller if the sale closes; and (o) means for displaying a ranking of the seller's sales performance in comparison with respective rankings of other sellers' sales performances.

31. A program storage device readable by the sales support computer of a specified one of claims 1–30 and encoding a program of instructions executable by the sales support computer for performing the functions recited in said specified one claim.

* * * * *